3,051,553
PRODUCTION OF BORON TRICHLORIDE
Paul M. Caro, Niagara Falls, N.Y., and Clark O. Miller and Raymond A. Xavier, Willoughby, Ohio, assignors, by mesne assignments, to Olin Mathieson Chemical Corporation, a corporation of Virginia
No Drawing. Filed Nov. 29, 1956, Ser. No. 625,200
2 Claims. (Cl. 23—205)

This invention relates to the production of boron trichloride. More specifically, it relates to the elimination of an undesirable solid material formed in the preparation of boron trichloride.

Boron trichloride is a compound that finds utility as an intermediate for the production of other boron containing compounds, such as diborane. It also is valuable as a refrigerant as is taught in Weber's U.S. Patent No. 2,097,482.

There are a number of methods of preparing boron trichloride. One of the methods involves passing chlorine gas through a reactor containing a heated mixture of boron trioxide and carbon. Examples of this may be readily found in the chemical literature and in the U.S. patents. Cooper's U.S. Patent No. 2,369,212 teaches such a method. Various difficulties, however, have been recognized in this method. Among the most important of these is the formation of a white solid deposit in the effluent lines of the reactor and in the subsequent solid traps. As much as 20 parts by weight of white solid material is formed per 80 parts by weight of boron trichloride produced. Analysis shows that this solid is a complex of boron trichloride and boric oxide ($B_2O_3$).

An object of this invention, therefore, is to eliminate the formation of the solid complex compound in the production of boron trichloride, and by so doing, to eliminate the need for constant dismantling and cleaning of the production equipment.

Another object of this invention is to convert the solid complex compound into boron trichloride and thus increase the over-all efficiency of the process.

Other objects of this invention will appear as the description thereof proceeds.

In accordance with the practice of this invention boron trichloride is manufactured according to the well known process in a primary reactor using heated boron trioxide and carbon in a chlorine atmosphere. The equation of the reaction is:

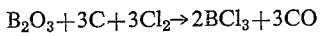

$$B_2O_3 + 3C + 3Cl_2 \rightarrow 2BCl_3 + 3CO$$

The effluent products from the primary reactor, containing among other things the complex of boron trichloride and boric oxide, is introduced into a secondary reactor, which is the essence of this invention.

The secondary reactor contains a heated carbonaceous material maintained at approximately 1200° F. to 1700° F. through which chlorine gas is circulated. Here the complex compound is converted to boron trichloride and carbon monoxide. Any physical arrangements whereby the products of the primary reactor pass through a heated carbonaceous bed in a chlorine atmosphere is within the scope contemplated in this invention. For example, the primary and secondary reactor can be contained in one unit, so that effluent products from the primary reaction flow immediately through the secondary carbon bed. The chlorine entering the secondary reactor can, if desired, be excess chlorine not consumed in the primary reactor. Preferably, however, the chlorine entering the secondary reactor is introduced as a separate stream, as was done in the examples set forth below.

The chlorine flow can be varied from a trace to a great excess and the reaction will still proceed. Most satisfactory results are obtained, however, when the chlorine flow rate is approximately 5 percent to 50 percent of that of the primary reactor. The size of the carbon bed is limited only by its ability to allow permeation of the gaseous reactants. It was found that a range of 1/10 to 1/500 cubic feet per pound per hour of boron trichloride produced was most satisfactory for the size of the bed in the secondary reactor.

The following examples illustrate in detail various embodiments falling within the scope of this invention but are not intended to limit such scope.

EXAMPLE I

Run 2, found in Table I, is a typical example of the method employed. Briquettes consisting of boric acid and lampblack were made by mixing boric acid and lampblack with a sugar and water binder in the weight ratio of 1 to 0.58 to 0.30 to 0.15. This mixture was mixed thoroughly in a rotating mixer and then formed into almond shaped briquettes by a roll mill type press. These briquettes were approximately 3/8 inch by 3/4 inch by 1/2 inch. The wet briquettes were then placed in a muffle furnace and sintered in a nitrogen atmosphere for about one hour at 1,000° F. This process removed most of the residual water and reduced the residual hydrogen content to 0.10 percent to 0.20 percent by weight. The briquettes were then analyzed and found to contain 17.4 weight percent boron in the form of boron trioxide. A 563 g. sample of these briquettes containing 98 grams of boron was then weighed for charging into the primary reactor.

The primary reactor consisted of a cylindrical nickel tube about 17 inches long with an internal diameter of about 3 inches. The tube was set in a vertical position and had three sets of gas burners for heating the outside surface thereof. A line was attached to the bottom portion of this reactor for the introduction of chlorine gas thereto while a second line led from the top to carry the effluent products to the secondary reactor.

The secondary reactor was similar to the first and consisted of a cylindrical nickel tube about 2 feet long having an internal diameter of about 2½ inches. This tube was likewise vertically mounted and was surrounded by electrical heating elements of an electric furnace. The line from the top of the primary reactor led to the top of the secondary reactor. This line was heated by a gas flame to prevent the solid complex compound from depositing therein. A second line also entered the top of this secondary reactor for the admission of chlorine gas thereto. A third line led from the bottom of this reactor to the condensing system.

The primary reactor was charged with the briquettes to a height of 11 inches and the secondary reactor with lampblack pellets to a height of 12 inches. These pellets were made similarily to the boron briquettes, that is, by mixing lampblack with a sugar and water binder and pressing into pellets and later sintering. Thermocouples were then inserted in the primary and secondary reactor to measure the temperature therein.

While the reactors were being brought up to operating temperature by the gas and electric heating elements, the system was purged with nitrogen gas. Nitrogen being inert to the reactants prevented premature reactions. When the primary reactor reached the temperature of 1247° F. and the secondary reactor a temperature of 1454° F., the nitrogen flow was stopped and the desired flow of chlorine introduced into both reactors. In this case, 15 standard cubic feet per hour flowed into the primary reactor and 1.5 standard cubic feet per hour into the secondary.

The effluent products from the secondary reactor were then allowed to flow through the line leading from the bottom portion of the secondary reactor and into the condensing system. This system consisted of one straight tube condenser and two spiral tube condensers in series in that order. These were cooled by circulating methanol, kept at a temperature of −50° C. Most of the boron trichloride was condensed as a liquid in this system and collected in vacuum insulated type flasks attached thereto. The gas fractions leaving the condensing system white solid complex entering the secondary reactor was in gaseous form.

Table II shows typical runs with varying gas rates with and without the secondary reactor. Table III indicates the effect of varying carbon beds and fixed chlorine feed rate for typical runs in the secondary reactor.

*Table I*

TYPICAL OPERATING DATA

| Run No. | Chlorine Feed, std. cu. ft./hr. | | Primary Reactor Charge Composition, gms. | | Unreacted Residual Boron Dischgd. from Primary Reactor, gms. | Bed height, in. | | Temperature, °F. | | Length of Run, hrs. | BCl₃ Produced in Condenser, gms. | Boron Recovered in Condenser and Water Scrubber as Analyzed, gms. | Yield[1] Based on Boron Reacted, Percent |
|---|---|---|---|---|---|---|---|---|---|---|---|---|---|
| | Primary Reactor | Secondary Reactor | Total Chg. Amt. | Boron by Analysis | | Primary Reactor | Secondary Reactor | Primary Reactor | Secondary Reactor | | | | |
| 1 | 9 | 1.8 | 619 | 107.8 | 11.9 | 11 | 12 | 1,184 | 1,511 | 0.92 | 705 | 66.9 | 69 |
| 2 | 15 | 1.5 | 563 | 98.0 | 4.1 | 11 | 12 | 1,247 | 1,454 | 0.68 | 867 | 83.1 | 89 |
| 3 | 3 | 0.6 | 519 | 90.3 | 26.1 | 11 | 24 | 1,157 | 1,542 | 2.08 | 534 | 52.4 | 82 |
| 4 | 3 | 0.6 | 568 | 92.9 | 12.1 | 11 | 6 | 1,202 | 1,472 | 1.42 | 303 | 30.4 | 38 |
| 5 | 15 | trace | 652 | 106.6 | 26.4 | 11 | 0 | 1,220 | 1,490 | 0.63 | 628 | 59.9 | 75 |
| 6 | 3 | trace | 502 | 76.6 | 26.2 | 11 | 0 | 1,256 | 1,508 | 1.58 | 363 | 34.9 | 69 |
| 7 | 6 | trace | 518 | 75.6 | 31.6 | 11 | 0 | 1,310 | 1,517 | 0.83 | 296 | 29.3 | 66 |

[1] Yield percent = $\dfrac{\text{(Weight boron in condenser and scrubber)} \times (100)}{\text{Total weight boron charged in primary reactor} - \text{weight boron discharged from primary reactor}}$ then passed through a water scrubber which consisted of a 3 inch diameter vertical column packed with Raschig rings over which water trickled. Here any remaining boron trichloride was hydrolyzed and trapped. The gases leaving the water scrubber passed through a wet test meter for measuring gas flow and were then discarded.

The run was continued for 0.68 hour. The reactors were then allowed to cool and the residual products from the primary reactor analyzed. The products were found to contain 4.1 g. of boron. Analysis was then made of the 864 g. of boron trichloride condensed in the condensing system and the boron products in the water scrubber. The total yield of boron from these two sources was found to be 83.1 g. The yield based on the boron reacted was computed to be 89 percent.

EXAMPLE II

A similar procedure to that described in Example I was used in run 3 of Table I. Here 519 g. of briquettes containing 90.3 g. of boron were placed in the primary reactor while 24 inches in height of carbon pellets were charged to the secondary reactor. The primary reactor operated at 1157° F. with a chlorine feed of 3 standard cubic feet per hour while the secondary reactor operated at 1542° F. and had admitted thereto 0.6 standard cubic foot of chlorine per hour. 534 g. of boron trichloride was condensed in the condensing system while a total of 52.4 g. of boron were found in the condensing system and water scrubber. The percentage yield based on boron consumed was 82 percent.

Data for other similar runs are to be found by referring to Table I.

Tests were made in the secondary reactor with varying chlorine rates and varying carbon bed depths. Under the particular reaction conditions chosen, the results of these tests showed that a minimum carbon bed of 0.012 cubic foot/pound/hour of boron trichloride produced is required to achieve a complete conversion of "white solids." The carbon bed in the secondary reactor was maintained around 800° C. (1472° F.) since high temperatures were found to reduce the formation of "white solids." The primary reactor temperatures were about 650° C. (1202° F.) since at that level advantage can be taken of exothermic heat of reaction. At about 700° C. (1292° F.) the reaction of $B_2O_3 + C + Cl_2$ becomes endothermic, thus requiring the uneconomical supplying of heat to the system. The line between the primary reactor and the secondary reactor was heated to prevent the "white solids" from depositing. This assured that the

*Table II*

EFFECT OF CHLORINE FEED RATE ON PRODUCTION RATE OF BCl₃ WITH AND WITHOUT THE SECONDARY REACTOR

| Cl₂ Feed Rate[1] to Primary Reactor, s.c.f./hr. | Production Rate-BCl₃, lb./hr. | | Increase In Production Rate Due to C-Bed, Percent |
|---|---|---|---|
| | Without C-Bed | With C-Bed[2] | |
| 3 | 0.471 | 0.607 | 28.8 |
| 9 | 1.39 | 1.74 | 25.2 |
| 15 | 2.26 | 2.92 | 29.2 |

[1] Additional 20 percent fed to C-Bed.
[2] C-Bed volume, 0.681 cubic feet.

*Table III*

EFFECT OF THE SECONDARY REACTOR'S CARBON BED ON PRODUCTION RATE AND YIELD OF BCl₃ AT CHLORINE FEED RATE OF 15 S.C.F./Hr.

| Carbon Bed Volume, Cubic Feet | Production Rate of BCl₃, lb./hr. | Overall Yield,[1] Percent |
|---|---|---|
| 0.00 | 2.26 | 74.6 |
| 0.0170 | 2.64 | 79.0 |
| 0.0341 | 2.91 | 88.5 |
| 0.0681 | 2.92 | 90.8 |

[1] Yields based on boron reacted.

It is claimed:

1. In a process for the production of boron trichloride wherein chlorine is introduced into a primary reaction zone containing a bed of carbon and boric oxide maintained at elevated temperatures such that a normally solid complex of boric oxide and boron trichloride is produced in addition to boron trichloride, the step of introducing the effluent from the bed and chlorine into a secondary reaction zone containing a bed consisting essentially of carbon maintained at a temperature within the approximate range 1200° F. to 1700° F. whereby the effluent from the secondary reaction zone is substantially free of the normally solid complex of boric oxide and boron trichloride, and recovering boron trichloride from the effluent from the secondary reaction zone.

2. In a process for the production of boron trichloride wherein chlorine is introduced into a primary reaction zone containing a bed of carbon and boric oxide maintained at elevated temperatures such that an effluent is formed containing boron trichloride, free chlorine and a normally solid complex of boric oxide and boron trichloride, the step of introducing the effluent from the bed into a secondary reaction zone containing a bed consisting essentially of carbon maintained at a temperature within the approximate range 1200° F. to 1700° F. whereby the effluent from the secondary reaction zone is substantially free of the normally solid complex of boric oxide and boron trichloride, and recovering boron trichloride from the effluent from the secondary reaction zone.

References Cited in the file of this patent

UNITED STATES PATENTS

| | | |
|---|---|---|
| 2,097,482 | Weber et al. | Nov. 2, 1937 |
| 2,369,212 | Cooper | Feb. 13, 1945 |
| 2,369,214 | Cooper | Feb. 13, 1945 |